United States Patent

Roberts et al.

[15] 3,665,212

[45] May 23, 1972

[54] ZERO CROSSING SOLID STATE SWITCH

[72] Inventors: Arthur S. Roberts, Bluff City; Orlyn W. Craig, Bristol, both of Tenn.

[73] Assignee: Sperry Rand Corporation, New York, N.Y.

[22] Filed: Nov. 24, 1970

[21] Appl. No.: 92,476

[52] U.S. Cl. ....................307/252 T, 307/202, 307/252 UA, 307/305, 317/33

[51] Int. Cl. ....................................................H03k 17/00

[58] Field of Search................307/252 T, 252 UA, 305, 202; 317/33

[56] References Cited

UNITED STATES PATENTS

| | | | |
|---|---|---|---|
| 3,305,739 | 2/1967 | Muskovac | 307/252 T |
| 3,265,955 | 8/1966 | Brown | 307/252 T |
| 3,475,653 | 10/1969 | Odenberg | 307/252 T |
| 3,491,264 | 1/1970 | Peterson | 307/252 T |

*Primary Examiner*—Donald D. Forrer
*Assistant Examiner*—David M. Carter
*Attorney*—Charles C. English, Rene A. Kuypers and William E. Cleaver

[57] ABSTRACT

There is disclosed herein a solid state switch for use with the application of a. c. power to a load circuit to eliminate high surge currents and transients that normally occur when switching line voltage to a load. The initial application of full a. c. power to a load circuit is restricted to the next time that the voltage waveform goes through the zero. During the initial application of power before the voltage goes through zero, the load circuit is protected by control circuitry including a surge resistor.

6 Claims, 2 Drawing Figures

PATENTED MAY 23 1972 3,665,212

INVENTORS
ARTHUR S. ROBERTS
ORLYN W. CRAIG
BY Rene A. Kuypers
ATTORNEY

ZERO CROSSING SOLID STATE SWITCH

BACKGROUND OF THE INVENTION

1. Field of the Invention

This invention relates in general to the field of solid state switching circuits and in particular to the field of a. c. switches for applying power to a load.

Description of the Prior Art

In a known prior art circuit as disclosed in the Dec., 1969 issue of "EEE" Magazine there are several recognized shortcomings. A review of the alleged article indicates that the circuit requires a d. c. power source for its operation. Furthermore, the known prior art solid state circuit requires that the load current passes through several components when full line voltage is applied. Accordingly, the prior art device is not efficient, is more complicated to operate, and is more expensive to manufacture.

SUMMARY OF THE INVENTION

There is disclosed herein a solid state a. c. switching device comprising back-to-back identical circuits which control each half cycle of the a. c. signal. When a line switch is closed, full power is not applied to the load until the next time that the voltage goes through zero. Prior to the time that the line voltage goes through zero, power is applied through the first identical circuit which includes a high resistance element thereby protecting the load from any surge current. Shortly after the line voltage crosses zero, the second identical current is activated so that full power is applied to the load.

DESCRIPTION OF THE PREFERRED EMBODIMENT

Figure 1:
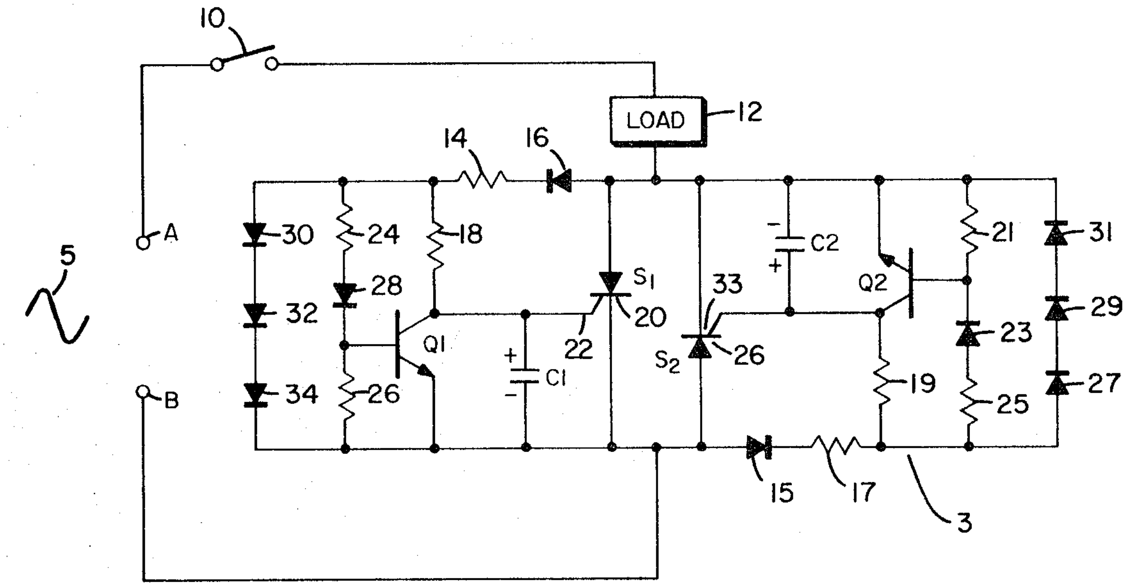
FIG. 1 depicts the a. c. switch utilized in conjunction with a load.

The solid state switch 3 of this invention comprises two identical circuits back-to-back which are arranged to operate upon the positive and negative excursions of an a. c. signal. The solid state switch 3 is interposed between the load 12 and the source of a. c. power 5. The a. c. power 5 is applied to the load 12 via the normally open switch 10. Each of the identical switches is composed principally of a silicon-controlled rectifier (hereinafter referred to as SCR), an NPN transistor and a surge resistor. The cooperation between these elements will be discussed below.

In operation, the power source 5 is applied to the load 12 by closing the switch 10. The power source signal 5 may be reviewed in greater detail by referring to FIG. 2. At the moment let us assume that as the switch 10 is closed the power source signal 5 is at position B of the cycle. It is evident by referring to FIG. 2 that the power cycle is positive going at point B and let us postulate for the sake of discussion that its value is greater than 1.4 volts. In other words, when the switch 10 is closed, the power cycle 5 has already moved from point A to point B as shown by the dotted line.

When point B has a value greater than 1.4 volts, a current path is established in the branch of the circuit comprising resistors 24 and 26, and diode 28 as well as the branch comprising diode 14 and resistor 16. This current path is established since the diodes 14 and 28 become forward biased. This is accomplished by the fact that when the power cycle 5 is at a point greater than 1.4 volts, the intermediate point between diodes 14 and 28 is greater than 0.7 volts. Accordingly, the cathode of diode 16 is sufficiently negative with respect to the anode so as to become forward biased. Similarly the anode of diode 28 is approximately 0.7 volts positive with respect to the cathode. Therefore, the forward biasing of diodes 16 and 28 allows a current to flow therein from terminal A of the power source 5 to terminal B via the resistors 14, 24 and 26.

The flow of current through the branch containing diode 28 causes the upper terminal of resistor 26 to be more positive than its lower terminal. Therefore, the potential at the base of transistor Q1 is more positive than its emitter to the extent that the base-emitter junction is forward-biased. Accordingly, a current path is also established from the terminal A of the power source 5 through the load 12, the diode 16, the resistors 14 and 18 and through the collector-emitter junction of transistor Q1 to the terminal B. Since the transistor Q1 is in a conduction state it acts as a short circuit and therefore the capacitor C1 does not become charged. Therefore the gate element 22 of the SCR S1 is substantially at the same potential as the cathode 20 and hence it is not activated. Current is also conducted at this time in the branch circuit containing the diodes 30, 32 and 34. Thus, as soon as the voltage of the source 5 is greater than approximately 2.8 volts i.e., 0.7 times the number of diodes in the circuit path), the diodes 30, 32 and 34 become forward-biased nearly simultaneously. Diode 16 became forward biased in the manner previously discussed. When each of the respective diodes 30, 32 and 34 are forward biased current is also conducted through this branch. Since the branch containing the transistor Q1 is in parallel with the branch containing diodes 30, 32 and 34, the latter acts as a clamping circuit. In other words, the voltage across the collector-emitter elements are clamped or limited to approximately 2.1 volts (i.e., 0.7 times the three diodes 30, 32 and 34). Accordingly, as the voltage source 5 increases in voltage from point B it does not harm the transistor Q1 since the voltage is maintained at a safe level by the diode clamping circuit.

Accordingly as the switch 10 is closed, current is being conducted through the load 12 via the forward-biased transistor Q1 as well as the high valued resistor 14 and diode 16. It should be noted hereat that the presence of a high surge current the instant that the voltage is applied is normal for certain types of loads and the greater the voltage the greater the surge current. High surge currents are often detrimental to the load or to the performance of the immediate or related equipment because of high peak power dissipation and because of conducted and radiated interference. In the particular circuit at hand it should be noted that this problem will be greatly reduced as no voltage greater than 1.4 volts can be instantaneously applied to the load without the load current being limited by the high resistance of resistor 14 in the control circuit. Uncontrolled load current is permitted only after a zero crossing where the current is determined by the sinusoidal voltage waveform which has no step changes. Consequently, under the conditions stated, namely, that the voltage applied from the source 5 is applied from point B to point C the load 12 will be protected by the high resistance in the conducting part of the circuit as above described and high surge currents which cause interference or damage cannot exist.

Figure 2:
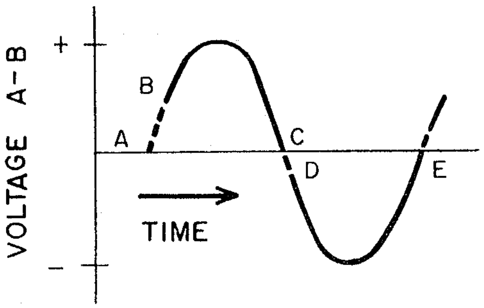
FIG. 2 depicts an a. c. signal which is initially applied to the load.

Referring to FIG. 2 is should be recognized that the point C represents the zero crossing point of the applied voltage wave source 5. At this point in time, the terminal A at 0 volts with respect to terminal B so that the diodes 14 and 28 no longer conduct since a proper bias voltage is no longer present.

As the voltage source 5 proceeds from point C to D in the negative direction as seen in FIG. 2, the upper terminal A (FIG. 1) therefore moves in a negative direction. It is assumed that capacitor $C_2$ has no charge. At this point in time it is further assumed that terminal A is not more negative than 1.4 volts. Since terminal B is positive with respect to A, current begins to conduct through the branch comprising resistor 19 and capacitor C2 via the diode 15 and the resistor 17. This conduction path is established since the diode 15 becomes forward biased. This results from the fact that the anode of diode 15 is connected to the lower terminal B and its cathode is connected via the resistors 17 and 19, the capacitor C2 and the load 12 to the terminal A which is negative-going as above described.

As the current flow is established in this branch the capacitor C2 charges up developing a voltage between the gate and cathode of SCR S2. When the charge on the capacitor C2 is that the voltage on the gate 26 is 0.4 to 0.8 volts positive with respect to cathode 33, the SCR S2 is caused to turn on. As understood in the art, an SCR provides a short circuit path when it is activated. Current therefore is applied to the load 12 from the power terminals A and B via the SCR S2. In an actual embodiment, the capacitor C2 charges to the SCR S2 trigger voltage within .02 milliseconds on a 115 volt, 60 Hertz line after the initial zero crossing. As mentioned above, this turnon of the SCR S2 occurs before the line voltage reaches an amplitude of 1.4 volts which is the voltage required to bias the transistor Q2 on and hold the gate voltage below the minimum value to trigger. Since the SCR S2 turns on approximately 0.013 milliseconds after zero crossing (as represented by the dotted line in FIG. 2 and exaggerated for clarity) and conducts for the balance of the half cycle essentially no power is lost by insertion of solid state switch 3 in the circuit. The SCR S2 therefore conducts for the remaining part of the cycle from point D to point E as shown in FIG. 2.

After the power cycle 5 again makes a zero crossing at point E the first identical circuit including the SCR S1 now becomes activated. This circuitry operates in the manner just described. Thus, as the power cycle starts to go positive after the zero crossing at E the capacitor C1 begins to charge in the direction shown after the diode 16 has been forward-biased. The diode 16 becomes forward-biased since its anode is connected to the positive going terminal A of the source 5 and its cathode is connected to terminal B, the capacitor C1 and the resistors 14 and 18. Accordingly, as soon as the anode of the diode 16 becomes sufficiently positive with respect to its cathode so as to become forward biased a charging path is established to charge capacitor C1 in the polarity shown. As soon as the gate element 22 becomes sufficiently positive with respect to the cathode 20 of the SCR S1, SCR S1 is caused to turn on. Current therefore is applied to the load 12 from the power terminals A and B via the SCR S1.

Again this occurs before the line voltage reaches the amplitude of 1.4 volts which is the voltage required to again bias the transistor Q1 to the conduction state and hold the gate voltage below the minimum trigger voltage. Therefore, since effectively a short circuit is established through this branch of the solid state switch 3 the current flows between the two terminals A and B and through the load 12. The remaining part of this circuit remains in the quiescent state since transistor Q1 cannot be forward-biased. C1, however, discharges through the gate element 22 to a value below the minimum voltage to turn on SCR S1.

At this point in time it will be recognized that both SCR's have alternately been placed in a short circuit condition. Thus, SCR S2 was placed in a short circuit condition when the power source 5 went negative after the zero crossing at C and SCR S1 was placed in a short circuit condition when the power source 5 went positive after the zero crossing at E. It should therefore be noted that an SCR can be restored to an open circuit condition by reducing the anode current to zero as occurs when the cathode is positive with respect to the anode or by interrupting its anode circuit as by opening switch 10. Accordingly, until that time when the switch 10 is opened, the SCR's S1 and S2 will alternately be in a conduction state. Therefore, after the power source 5 has passed the zero crossing E current will be conducted alternately between the two SCR's S1 and S2 for as long a period of time as the switch 10 is closed. When the switch 10 is open the solid state switch 3 will return to its off state. A reclosing of the switch 10 will of course cause the solid state switch to repeat its operation previously discussed.

In summary, the circuit operates by protecting the load from a surge current during turn-on and eliminates conducted and radiated interference caused by high surge currents at turn-on by utilizing a high resistance element when the initially applied instantaneous voltage is greater than 1.4 volts. If the initially applied voltage is less than 1.4 volts, no surge currents of any consequence will occur and this is the ideal time to switch power to the load. This circuit automatically performs this switching at the zero voltage crossings following closure of the line switch.

We claim:

1. The combination comprising:

a. a source of power comprising an alternating signal;

b. a load;

c. a switch;

d. a control device comprising first and second back-to-back circuits each of which has the same circuit components, said first circuit conducting current respectively during the positive excursion of said alternating signal and said second circuit conducting current during the negative excursion of said alternating signal;

each said circuit including means for applying power to said load through said switch when the power is initially applied during the zero crossing portion of said signal;

each said respective circuit further including protective means for applying power to said load through said switch when the power is initially applied and the signal is past said zero crossing portion of said signal, said application of power through said protective means eliminating high surge currents and transients from being applied to said load.

2. The combination in accordance with claim 1 wherein said means for initially applying power to said load during the zero crossing of said signal comprises a silicon-controlled rectifier including a capacitor charging circuit connected to the gate electrode of said rectifier.

3. The combination in accordance with claim 1 wherein said protective means includes a surge resistor.

4. The combination in accordance with claim 3 wherein said surge resistor is coupled to a semiconductor means, current being conducted through said resistor when said semiconductor means becomes forward-biased.

5. 5. The combination in accordance with claim 4 wherein power is applied to said load through said surge resistor and semiconductor means when said alternating signal is greater than approximately 1.4 volts.

6. The combination in accordance with claim 2 wherein power is applied to said load through said silicon-controlled rectifier when said alternating signal is less than approximately 1.4 volts.

* * * * *